US009088066B2

(12) United States Patent
Levionnais et al.

(10) Patent No.: US 9,088,066 B2
(45) Date of Patent: Jul. 21, 2015

(54) ANTENNA FOR AN NFC DEVICE

(75) Inventors: Philippe Levionnais, Caen (FR); David Picquenot, Authie (FR)

(73) Assignee: Orange, Paris (FR)

( * ) Notice: Subject to any disclaimer, the term of this patent is extended or adjusted under 35 U.S.C. 154(b) by 210 days.

(21) Appl. No.: 13/700,168

(22) PCT Filed: May 23, 2011

(86) PCT No.: PCT/FR2011/051162
§ 371 (c)(1),
(2), (4) Date: Nov. 27, 2012

(87) PCT Pub. No.: WO2011/148088
PCT Pub. Date: Dec. 1, 2011

(65) Prior Publication Data
US 2013/0069844 A1    Mar. 21, 2013

(30) Foreign Application Priority Data
May 27, 2010   (FR) ..................... 10 54118

(51) Int. Cl.
*H01Q 7/00*       (2006.01)
*G06K 19/077*   (2006.01)
*H01Q 1/22*       (2006.01)
(52) U.S. Cl.
CPC ............ *H01Q 7/00* (2013.01); *G06K 19/07773* (2013.01); *G06K 19/07779* (2013.01); *G06K 19/07783* (2013.01); *G06K 19/07784* (2013.01); *H01Q 1/2225* (2013.01)

(58) Field of Classification Search
USPC ........ 343/741, 866, 702; 340/572.7; 455/41.1
See application file for complete search history.

(56) References Cited

U.S. PATENT DOCUMENTS

| 2005/0011961 | A1* | 1/2005 | Uesaka ......................... 235/492 |
| 2007/0164867 | A1* | 7/2007 | Kawai ........................ 340/572.7 |
| 2009/0085133 | A1* | 4/2009 | Doan ............................. 257/428 |
| 2009/0315799 | A1* | 12/2009 | Eray et al. ..................... 343/788 |
| 2010/0090805 | A1* | 4/2010 | Llbotte ........................ 340/10.2 |

FOREIGN PATENT DOCUMENTS

| EP | 1 681 778 A2 | 7/2006 |
| EP | 1 843 282 A1 | 10/2007 |
| WO | WO 2007/080214 A1 | 7/2007 |

* cited by examiner

*Primary Examiner* — Dieu H Duong
(74) *Attorney, Agent, or Firm* — Drinker Biddle & Reath LLP

(57) ABSTRACT

An antenna for near-field communication, comprising at least four turns and having an outside periphery and an inside periphery both of substantially rectangular shape. An inter-turn distance separates two adjacent turns. Each turn has a width substantially equal to the inter-turn distance. In addition, the inside periphery has: (i) a length less than 7 times the distance between the outside periphery and the inside periphery along a longitudinal axis of said antenna, and (ii) a width less than 4 times the distance between the outside periphery and the inside periphery along a lateral axis of said antenna.

8 Claims, 3 Drawing Sheets

ANTENNA FOR AN NFC DEVICE

CROSS-REFERENCE TO RELATED APPLICATIONS

This application is the U.S. national phase of the International Patent Application No. PCT/FR2011/051162 filed May 23, 2011, which claims the benefit of French Application No. 1054118 filed May 27, 2010, the entire content of which is incorporated herein by reference.

FIELD

The present invention relates to the sector of contactless technology, and more particularly to the sector of the use of such a technology in mobile communication terminals to run so-called "contactless" applications.

BACKGROUND

An exemplary implementation of contactless applications relies on a technology of NFC type (for 'Near Field Communication'). These contactless applications may relate, for example, to electronic transactions in the banking sector or else in public transports, or else also identification and/or access control applications. A communication of NFC type is established between two contactless entities, or else two NFC entities, one operating in the guise of contactless card and the other operating in the guise of contactless card reader. In another mode of operation, termed the P2P mode (for 'Peer To Peer'), two NFC entities operating in the guise of contactless card exchange data locally and therefore play an equivalent role.

Such an NFC entity is composed of a near-field communication device, or else NFC device hereinafter, and of an associated antenna which allows it to set up a contactless communication with another NFC entity. The NFC entity which operates in the guise of contactless card can for example correspond to an 'RFID' (from 'Radio Frequency Identification') radio tag. An NFC entity which operates in the guise of card reader can correspond for example to an electronic payment terminal or a facility for validating electronic transport tickets, or else a tag reader adapted for identifying radio tags, according to the applications considered.

The functionalities of a contactless entity such as this may be provided by a mobile telephone terminal. In this case, the mobile telephone terminal contains a subscriber identity card, or else SIM card (from 'Subscriber Identity Module'), as well as an NFC device and its associated antenna.

In this context, applications termed "contactless", which require a certain level of security, are customarily installed in the subscriber identity card of the mobile terminal, or "SIM" card. A communication can thus be established within the terminal between the contactless application of the subscriber identity card and the contactless device. Next, the contactless device, installed on the mobile terminal, allows a dialog by the mobile terminal, more precisely by the application concerned, with another contactless entity situated in proximity to the terminal. These mobile telephones can then be used in the guise of contactless entity for example.

The antennas which are used in this context may be of very diverse shapes, addressing especially both performance criteria and also criteria relating to the space occupied by the antenna.

Antennas for NFC devices are thus known which are of square or rectangular or else circular shape and which comprise a plurality of turns wound around one another.

In the search for an efficacious shape of NFC antenna, it is conventional to take care to preserve an empty space, of significant size in relation to the size of the antenna, at the center of the turns so as to allow the magnetic flux generated by the turns to pass through.

FIG. 1 illustrates an antenna according to the prior art. This antenna is a SONNET antenna illustrated on the site referenced hereinbelow:

http://www.sonnetsoftware.com/support/files/appnote/
SAN-206A%20RFID%20Antenna%20Design%200602.pdf It is formed of two antenna wires 11 and 12 each making three revolutions and therefore exhibits six turns. Each turn has a thickness of 0.5 mm. Two neighboring turns are spaced apart by 0.5 mm consecutively.

This antenna shape complies with the constraint mentioned hereinabove, consisting in maintaining a consistent free space in relation to the antenna as a whole for the electromagnetic flux generated. Indeed, having turns of relatively small thickness, this antenna makes it possible to preserve a space for the passage of the magnetic field within the turns.

SUMMARY

The present invention is aimed at improving the performance of this type of antenna.

A first aspect of the present invention proposes an antenna for near-field communication, said antenna comprising at least four turns and exhibiting an exterior periphery and an interior periphery of substantially rectangular shape;

an inter-turn distance separating two neighboring turns;

in which each turn has a width substantially equal to the inter-turn distance; and in which the interior periphery has, on the one hand, a length of less than 7 times the distance between the exterior periphery and the interior periphery along a longitudinal axis of said antenna, and, on the other hand, a width of less than 4 times the distance between the exterior periphery and the interior periphery along a lateral axis of said antenna.

Provision is made for the turns to hug shapes of different respective sizes. The expression 'inter-turn distance' between two neighboring turns is intended to mean the distance between two consecutive turns or more precisely, the distance between the interior contour of the largest turn and the exterior contour of the smallest turn out of the two neighboring turns considered, along an axis perpendicular to the considered parts of the contours.

The interior, respectively exterior, periphery of the antenna are intended to mean the interior, respectively exterior, contour of the smallest, respectively of the largest, turn of the antenna. Stated otherwise, the interior periphery of the antenna may be considered to be the boundary between the antenna and an empty space at the center of the antenna, or else at the center of the turns, and the exterior periphery of the antenna may be considered to be the boundary between the antenna and the exterior of the antenna.

The term 'substantially rectangular shape' is intended to mean a shape which exhibits rectilinear opposite sides, or at the very least which appear to the naked eye to be rectilinear, and parallel, or at the very least which appear to the naked eye to be parallel to one another.

A substantially rectangular shape exhibits the advantage of occupying reduced space with respect to a similar antenna of circular shape.

However, a 'substantially rectilinear shape' does not systematically imply that the consecutive sides cut one another at right angles. Indeed, a substantially rectangular shape does not preclude the possibility that two consecutive sides exhibit roundings between them.

In one embodiment of the present invention, provision may be made for the exterior contour of the turns at the level of the junctions of two consecutive sides to form a rounding, whereas the interior contour of the turns forms right angles at the level of the junctions of two consecutive sides, or at the very least for this interior contour to appear to the naked eye to form right angles, at the level of these junctions.

Such an angle shape of the turns allows good circulation of the current, by virtue of the roundings in the exterior contour.

The fact that the width of a turn is 'substantially equal to the inter-turn distance' is intended to mean the fact that the width of a turn is relatively very close to the inter-turn distance. Such is the case, especially, when the width of turn is equal to the inter-turn distance plus or minus 20%.

In one embodiment of the present invention, the antenna for near-field communication has an interior periphery exhibiting, on the one hand, a length of greater than 5 times the distance between the exterior periphery and the interior periphery along a longitudinal axis of said antenna, and, on the other hand, a width of greater than 2 times the distance between the exterior periphery and the interior periphery along a lateral axis of said antenna.

By virtue of these conditions, it is possible to comply with a fairly large empty space at the center of the antenna so as to allow the passage of a magnetic flux generated by the antenna turns in such a way that this antenna exhibits high performance.

In one embodiment of the present invention, the inter-turn distance is substantially equal to 1 mm.

The term 'substantially' is intended to mean the fact that the inter-turn distance is relatively very close to 1 mm. Such is the case for example when the inter-turn distance is equal to 1 mm plus or minus 20%.

It should be noted here that such a width of turn is relatively wide for this type of antenna. Indeed, it is conventional to limit this width so as to preserve enough space at the center of the antenna while having a plurality of turns.

Such a width of turn allows better circulation of current and provides a high level of induction.

In one embodiment, the exterior periphery of the antenna has a length substantially equal to 55 mm and a width substantially equal to 36 mm.

The term 'substantially' signifies here to plus or minus 20% maximum. This size may advantageously be suited to use in a mobile telephone.

Such an antenna can allow a range of the order of 8 to 10 cm.

The four turns can correspond in order of decreasing size to first, second, third and fourth turns. Each of the turns can have a first part and a second part. Provision may then be made for the first part of the first turn to be coupled to the second part of the second turn, the second part of the first turn to be coupled to the first part of the second turn, the first part of the third turn to be coupled to the second part of the fourth turn, and the second part of the third turn to be coupled to the first part of the fourth turn.

Such an antenna shape exhibits surprising performance, especially through the fact that in contradistinction to the principles complied with in the prior art, the empty space at the center of the turns is relatively restricted.

A second aspect of the present invention proposes an electronic entity adapted for a mobile terminal, the mobile terminal being able to comprise a subscriber identity card, the electronic entity comprising a near-field communication device, an antenna according to the first aspect of the present invention for the near-field communication device and a wire-based interface intended to link the near-field communication device to the subscriber identity card,
the near-field communication device being positioned at the level of the antenna.

The expression 'NFC device' or 'contactless device' are intended to mean an assembly comprising an NFC component, or else contactless component, and other electronic components which are useful for its implementation in a circuit for its use, as for example capacitors or else resistors.

A third aspect of the present invention proposes a mobile terminal adapted at one and the same time to operate in a communication network and to manage near-field communications, able to receive an electronic entity according to the second aspect of the present invention.

A fourth aspect of the present invention proposes a mobile communication system comprising a plurality of mobile terminals according to the third aspect of the present invention.

BRIEF DESCRIPTION OF THE DRAWINGS

Other aspects, aims and advantages of the invention will become apparent on reading the description of one of its embodiments.

The invention will also be better understood with the aid of the drawings, in which.

DETAILED DESCRIPTION

Figure 1:
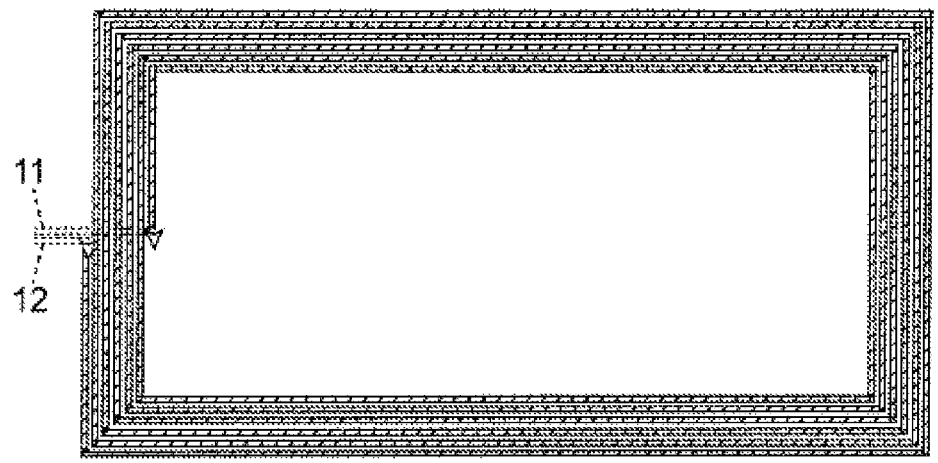
FIG. 1, already described, illustrates an antenna shape according to the prior art.
Figure 2:
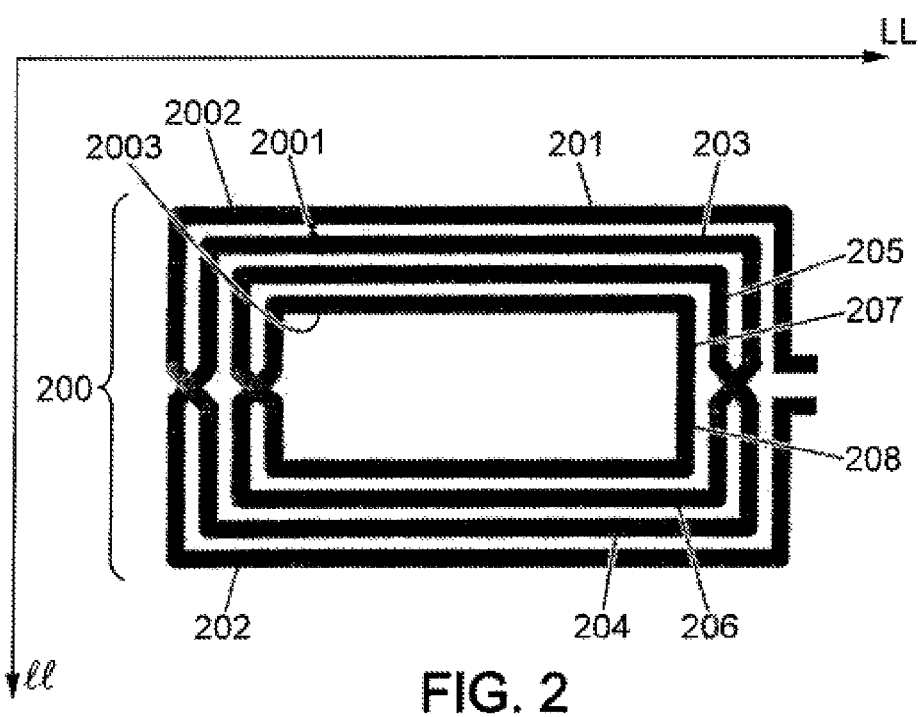
FIG. 2 illustrates an antenna according to one embodiment of the present invention.

FIG. 2 illustrates an antenna shape according to one embodiment of the present invention. The illustration complies neither with the actual magnitudes, nor with the actual proportions.

This antenna 200 for near-field communication has an inter-turn distance substantially equal to 1 mm.

According to the characteristics of the antenna of one embodiment, at the center of its turns is located an empty space:
   of length less than 7 times the distance between the exterior periphery 2002 and the interior periphery 2003 along the longitudinal axis LL of the antenna, that is to say 7 mm, i.e. a length of less than 49 mm;
   of width less than 4 times the distance between the exterior periphery 2002 and the interior periphery 2003 along the lateral axis 11 of the antenna, that is to say 7 mm, i.e. a width of less than 28 mm.

The exterior periphery 2002 of the antenna can in this case exhibit a length substantially equal to 63 mm and a width substantially equal to 42 mm.

In one embodiment, the exterior periphery 2002 of the antenna 200 can also have a length substantially equal to 55 mm and a width substantially equal to 36 mm, the empty center defined by the interior periphery 2003 of the antenna then having a length substantially equal to 41 mm and a width substantially equal to 22 mm.

However, it seems reasonable to make provision for the empty center of the antenna to exhibit a length of greater than 5 times the distance between the exterior periphery 2002 and the interior periphery 2003 along the longitudinal axis LL of the antenna and a width of greater than 2 times the distance between the exterior periphery 2002 and the interior periphery 2003 along the lateral axis 11 of the antenna.

It comprises four turns corresponding, in order of decreasing size, to first, second, third and fourth turns.

The first turn has a first part 201 and a second part 202;
the second turn has a first part 203 and a second part 204;
the third turn has a first part 205 and a second part 206;
the fourth turn has a first part 207 and a second part 208.

According to one embodiment, the first part 201 of the first turn is coupled to the second part 204 of the second turn, the second part 202 of the first turn is coupled to the first part 203 of the second turn, the first part 205 of the third turn is coupled to the second part 208 of the fourth turn, and the second part 206 of the third turn is coupled to the first part 207 of the fourth turn.

Advantageously, this antenna exhibits performance allowing a range of 8 to 10 centimeters.

Figure 3:
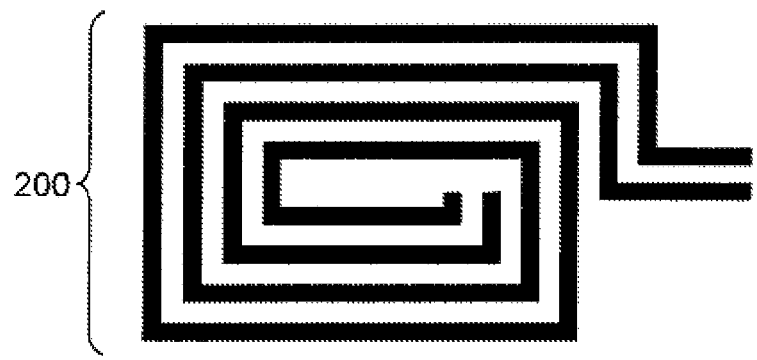
FIG. 3 illustrates an antenna according to another embodiment of the present invention.

FIG. 3 illustrates an antenna according to another embodiment of the present invention.

The antenna illustrated here exhibits characteristics similar to that illustrated in FIG. 2, except that the two antenna wires constituting it are wound in a parallel manner so as to form the 4 turns. There is no crossover between turns as is the case in the antenna illustrated in FIG. 2.

Here again, it should be noted that the figure is not to the scale of the actual characteristics of the antenna.

Figure 4:
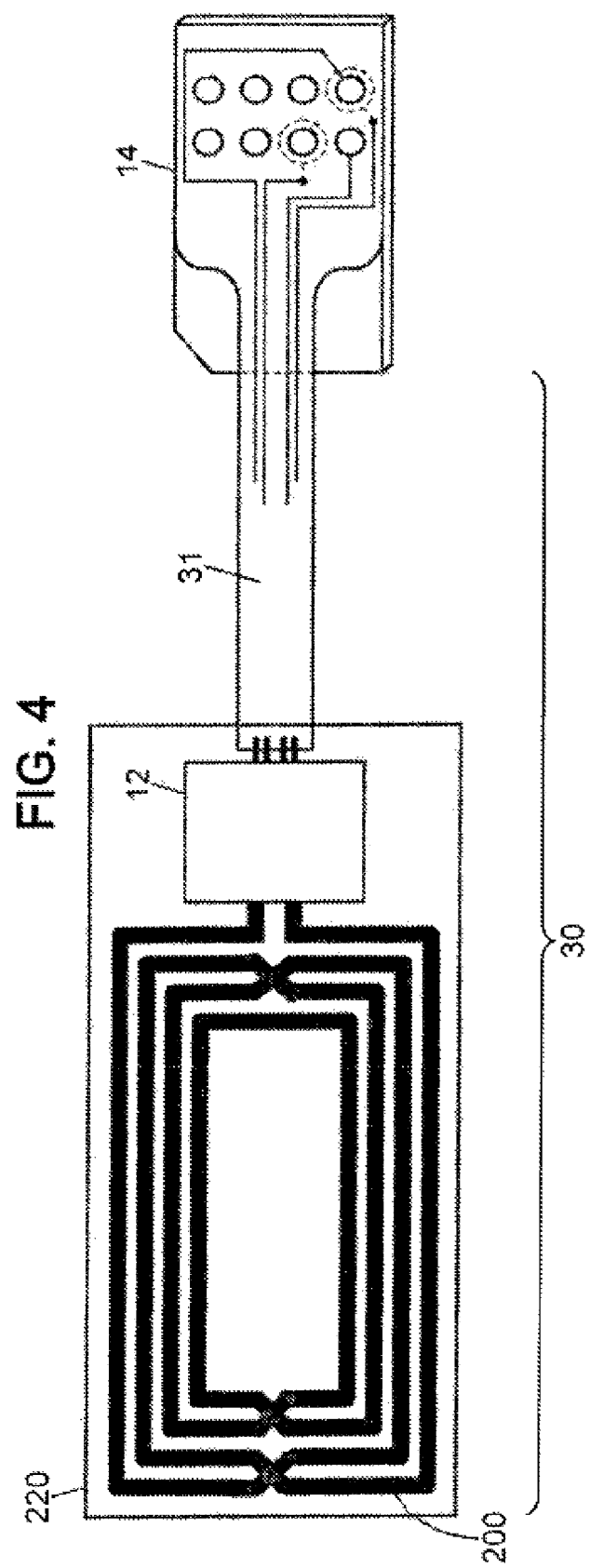
FIG. 4 illustrates an electronic entity according to one embodiment of the present invention.

FIG. 4 illustrates an electronic entity according to one embodiment of the present invention.

An electronic entity 30 such as this is intended to be used in a mobile terminal as for example a mobile telephone terminal, so that the mobile terminal offers functionalities of mobile telephony type and functionalities of contactless card type. For this purpose, the terminal therefore comprises a subscriber identity card 14, for example a "SIM" card (for "Subscriber Identity Module"), for mobile telephone applications, and the electronic entity according to one embodiment of the present invention comprises a near-field communication device 12, that is to say an NFC device comprising an NFC electronic device and electronic circuits (not represented in FIG. 4), an antenna 200 for this NFC device, as well as a wire-based interface 31 intended to link the NFC device with the SIM card from which it is remote.

In one embodiment of the present invention, the NFC device is positioned at the level of the antenna 200 and linked to the subscriber identity card 14 via the wire-based interface 31. The wire-based interface 31 comprises:

a first linking wire, which may be made of copper, intended to transport information according to a near-field communication management protocol; and
second and third linking wires which may be made of copper, intended to transport the electrical power supply between SIM card and NFC device.

Advantageously, by virtue of this electronic entity comprising an antenna 200 according to one embodiment of the present invention, it is possible to adapt a mobile terminal of mobile telephone type to applications of NFC type. Indeed, an electronic entity 30 such as this can conveniently be linked to any SIM card inserted into a mobile terminal thus benefiting especially from the electrical power supply provided to the SIM card.

This antenna can exhibit dimensions which are particularly suited to be embedded onboard in an arbitrary manner and integrated into the mobile telephone.

In a more precise manner, a mobile terminal generally exhibits mechanical contacts which are adapted for exerting a pressure at the level of the contacts of the SIM card. Two of these contacts represent the electrical power supply respectively with a ground terminal GND (for 'Ground') and a power supply terminal VCC. Provision is made to position contacts of the wire-based interface according to one embodiment of the present invention between the contacts of the mobile terminal GND and VCC and the corresponding contacts of the SIM card.

In order to reduce the antenna wire and therefore to increase radio reception performance at the NFC level, provision may be made to position the NFC device at the level of the antenna.

Here the expression 'positioned at the level of the antenna' is intended to mean the fact that the NFC device and the antenna are not remote, but on the contrary positioned in proximity to one another in such a way that there are no degradations of analog signals between the antenna and the NFC device. In one embodiment, the NFC device may be integrated directly into the antenna.

Provision may also be made for wires of relatively short length to link the NFC device and its antenna. In this case, the length of these antenna wires is such that transmission of the signals on these wires is not disturbed by the environment in the casing of the mobile terminal, such as metallic masses or electronic devices in particular.

In one embodiment of the present invention, the antenna is an antenna suited to being positioned in a mobile terminal casing and to being conveniently detachable. In this case, when the antenna is removed, the NFC device which is connected directly to it is also removed.

In an electronic entity such as this, provision is therefore made to implant the NFC device or near-field communication device, at the level of the antenna which is associated with it so as to implement the communications that it manages. By thus co-locating the near-field communication device and its antenna, it is possible to guarantee a certain level of quality of the radio functionalities of NFC type regardless of the type of mobile telephone in which this electronic entity is positioned and also regardless of the path followed by the wire-based interface between the SIM card and the NFC device within the casing of the telephone.

Provision may especially be made for a support 220 of the NFC device 12 and of the antenna 200 to exhibit a rectangular shape of a length of about 76 mm by a width of about 40 mm (about, that is to say, to plus or minus 20%).

An electronic entity is obtained which allows a user of a mobile terminal to benefit at one and the same time from the mobile telephone functionalities and from the contactless card functionalities, and allows him to retain all these functionalities, even in the case of a change of mobile telephone. Indeed, a user who changes mobile telephone can, in a conventional manner, insert the SIM card of his former telephone into his new telephone; the SIM card may here be completely independent of the electronic entity and therefore completely standard. He can furthermore conveniently position the electronic entity in his new telephone and connect it to the SIM card, thus easily accessing all the contactless applications and the necessary data which are stored therein. This architecture of electronic entity exhibits the advantage of being able to connect directly to any SIM card of a mobile telephone and of being able to be operational via the SIM card considered.

There is, in one embodiment of the present invention, a wire-based interface between the SIM card and the near-field communication device since the NFC device is remote from the SIM card, that is to say it is not integrated into the SIM card.

Thus, advantageously, the contacts of the SIM card, which are in general the contacts C4 and C8, previously used to connect, via ribbon wiring, the antenna to the NFC device in the SIM card, may be freed, since the NFC device is not implemented in the SIM card.

Provision may here be made for a wire-based interface of a length suited to each mobile terminal casing without however disturbing the performance of the NFC applications.

An embodiment of the present invention is found advantageously to be applied for NFC devices which consist in emulating a contactless card or else for devices which consist in operating in the guise of card reader.

In the case of operation in card emulation mode, the electrical power supply for the NFC device may be provided via the antenna 200 of the NFC device by an NFC appliance with which the contactless card converses, that is to say by the appliance which operates in the guise of contactless card reader. Here, the wire-based interface can support only a single linking wire between the NFC device and the SIM card, this wire being that which is adapted for transporting information according to a near-field communications management protocol.

In other applications, the NFC device needs to be powered directly.

For this purpose, a wire-based interface such as this can also comprise a link to transport an electrical power supply. Thus, the wire-based interface can furthermore transport an electrical power supply from the mobile terminal to the NFC device.

Alternatively, provision may be made for the NFC device to be connected directly to the battery of the mobile terminal. In this case, the wire-based interface is not needed at all for the electrical power supply to the NFC device. Furthermore, it then suffices to change the battery in order to transform a conventional mobile terminal into an NFC mobile terminal according to one embodiment of the present invention.

Figure 5:
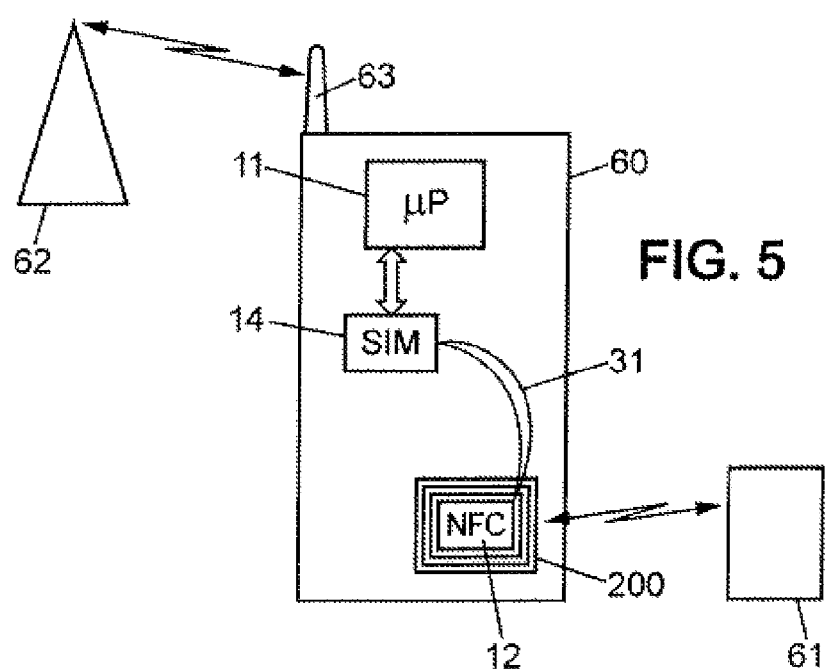
FIG. 5 illustrates a mobile telephone system according to one embodiment of the present invention comprising a terminal according to one embodiment of the present invention.

FIG. 5 illustrates a mobile telephone system according to one embodiment of the present invention and a terminal according to one embodiment of the present invention.

Such a system comprises a plurality of terminals 60, each being adapted, according to one embodiment of the present invention, on the one hand to manage mobile telephone communications, and on the other hand to manage communications of NFC type. Such a terminal 60 is able to receive an electronic entity according to one of the embodiments of the present invention.

The system comprises appliances of mobile telephone networks, such as base stations 62, with which the terminals 60 can communicate via an antenna 63 of the mobile telephones. Each mobile terminal 60 comprises a microprocessor 11. The system also comprises an NFC applications NFC appliance 61 with which the mobile telephones 60 can communicate via the antenna 200. These two antennas 63 and 200 are adapted for the implementation respectively of mobile telephone applications and of NFC applications.

The invention claimed is:

1. An antenna for near-field communication,
said antenna comprising at least four turns and exhibiting an exterior periphery and an interior periphery of substantially rectangular shape;
an inter-turn distance separating two neighboring turns;
wherein each turn has a width substantially equal to the inter-turn distance; and
wherein the interior periphery has a length of less than 7 times the distance between the exterior periphery and the interior periphery along a longitudinal axis of said antenna, and has a width of less than 4 times the distance between the exterior periphery and the interior periphery along a lateral axis of said antenna.

2. The antenna for near-field communication as claimed in claim 1, wherein the interior periphery has a length of greater than 5 times the distance between the exterior periphery and the interior periphery along the longitudinal axis of said antenna, and has a width of greater than 2 times the distance between the exterior periphery and the interior periphery along the lateral axis of said antenna.

3. The antenna for near-field communication as claimed in claim 1, wherein the inter-turn distance is substantially equal to 1 mm.

4. The antenna for near-field communication as claimed in claim 1, wherein the exterior periphery of said antenna has a length substantially equal to 55 mm and a width substantially equal to 36 mm.

5. The antenna for near-field communication as claimed in claim 1, the four turns corresponding in order of decreasing size to first, second, third and fourth turns,
each of said turns having a first part and a second part;
wherein the first part of the first turn is coupled to the second part of the second turn, the second part of the first turn is coupled to the first part of the second turn,
the first part of the third turn is coupled to the second part of the fourth turn, and the second part of the third turn is coupled to the first part of the fourth turn.

6. An electronic entity adapted for a mobile terminal, said mobile terminal being able to comprise a subscriber identity card,
said electronic entity comprising a near-field communication device, an antenna as claimed in claim 1 for the near-field communication device and a wire-based interface intended to link the near-field communication device to the subscriber identity card,
the near-field communication device being positioned at the level of the antenna.

7. A mobile terminal adapted to simultaneously operate in a communication network and to manage near-field communications, able to receive the electronic entity as claimed in claim 6.

8. A mobile communication system comprising a plurality of mobile terminals as claimed in claim 7.

* * * * *